July 10, 1951     C. E. ARMSTRONG     2,559,924

TRAP

Filed Aug. 1, 1950

C. E. Armstrong
INVENTOR

BY *CA Snow & Co.*
ATTORNEYS.

Patented July 10, 1951

2,559,924

UNITED STATES PATENT OFFICE 2,559,924

TRAP

Charles E. Armstrong, Oakwood, Okla.

Application August 1, 1950, Serial No. 177,061

2 Claims. (Cl. 43—80)

This invention relates to a trap designed primarily for use in killing gophers, moles, rats, and other rodents. More particularly the invention has reference to an improvement on the trap construction shown in my Patent 1,790,740, issued February 3, 1931.

The present invention aims to provide a simple shank construction for the trap permitting the recessing of a latch within the outer confines of the shank without the necessity of cutting away large portions of the shank, permitting the shank to provide a guide for a trip rod, and eliminating the need for a separate guide sleeve previously required to guide said trip rod.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings

Figure 1:
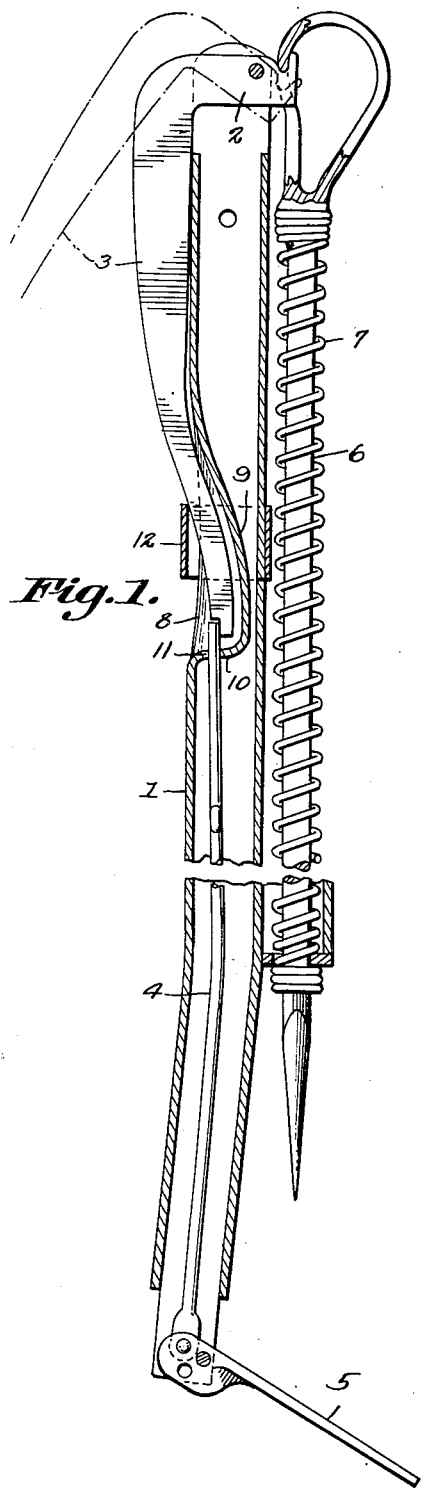
Figure 1 is a longitudinal section through the improved trap, the dotted lines indicating a partially released position of the latch.
Figure 2:
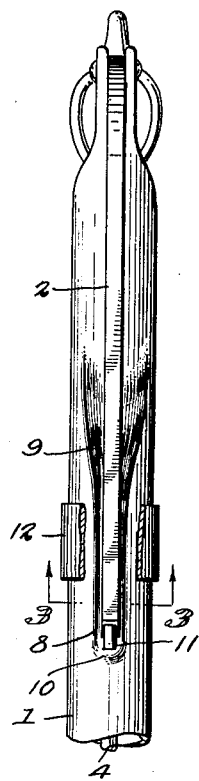
Fig. 2 is an elevation of the upper portion of the trap, portions being broken away, taken from the left of Fig. 1.

Referring to the drawings in detail, a tubular shank I constitutes the body of the trap. In one end thereof is pivoted a latch 2 having the arm 3 extending longitudinally of the shank, the free end of the arm 3 curving inwardly of the shank.

A trip rod 4 is slidably reciprocable inside the shank, and is actuated by a trigger 5. In the set position of the trap the trip rod is engaged with the inwardly curved free end of arm 4 to hold said arm in the full line position illustrated in Fig. 1. When the trigger is actuated by an animal, rod 4 is pulled downwardly, releasing arm 3. In this connection the latch 2 is notched to engage one end of a stem 6 surrounded by a spring 7 which is tensioned when the trap is set. On release of arm 3, spring 7 is released for return, swinging the latch outwardly as shown by dotted lines in Fig. 1 and being released from the notch. The stem 6 having a spear at one end is thus propelled at great force downwardly in Fig. 1 to spear the animal. This basic operation is the same as in my previous construction.

In the construction shown in the patent, however, it was necessary to provide a special guide sleeve inserted upwardly inside the tubular shank I to provide a guide for the reciprocable trip rod 4. Additionally a substantial portion of the shank had to be cut away to permit the inwardly curved free end of the arm 3 to be swung into the interior of the shank.

Figure 3:
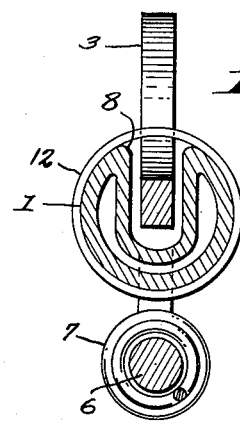
Fig. 3 is an enlarged section on line 3—3 of Fig. 2.

I eliminate this construction by pressing a portion of the shank wall inwardly to provide a depression 8 of U-shaped cross section (Fig. 3) in which the free end of arm 3 can be recessed. This depression has a gradually sloping bottom 9 curved correspondingly to the curvature of the arm 3 and merging at its inner end into an end wall 10 extending transversely of the tubular shank. An opening 11 is formed in the end wall 10 and thus the end wall 10 comprises a guide for the rod 4.

A safety ring 12 extends around shank I and is shiftable longitudinally of the shank into or away from arm encircling position.

It is thus seen that without the formation of special cut away parts and without the insertion of additional guide plugs or sleeves, I am able to provide a means for extending an arm the main part of which is disposed outside the confines or outer diameter of the shank in such a manner that a part of said arm recesses within the confines of said outer diameter, and that I am at the same time able to provide a transversely disposed guide for a reciprocable rod with said guide being formed from the material of the recessed shank wall.

What is claimed is:

1. In a trap the combination with a swinging latch and a reciprocable trip rod releasably engaging the latch against swinging, of a tubular shank providing a pivot mounting for the latch and a mounting for sliding reciprocable movement of the rod, said shank being of tubular formation, the wall of the shank having a depressed portion intermediate its ends for recessing of the latch within the confines of the shank diameter, said latch being disposed exteriorly of the shank, said depressed portion of the shank wall having an opening slidably receiving said trip rod for extension of the trip rod into releasable engagement with the recessed latch.

2. The combination with a swinging latch and a slidably reciprocable trip rod of a tubular shank on which the latch is pivotally mounted, said latch extending longitudinally of and exteriorly of the shank and having a free end curving inwardly towards the shank, the shank wall being formed with a longitudinal depression the bottom wall of which curves correspondingly to said inwardly curved portion of the latch for recessing of the latch within said depression, said bottom merging into an end wall of the depression disposed transversely of the shank, said end wall having an opening in which the trip rod is slidably positioned, said trip rod releasably engaging the recessed latch.

CHARLES E. ARMSTRONG.

REFERENCES CITED

The following references are of record in the file of this patent:

UNITED STATES PATENTS

| Number | Name | Date |
|---|---|---|
| 1,194,239 | Rogers | Aug. 8, 1916 |
| 1,790,740 | Armstrong | Feb. 3, 1931 |
| 2,325,107 | Burns | July 27, 1943 |
| 2,505,051 | Kridler | Apr. 25, 1950 |